United States Patent Office 3,126,397
Patented Mar. 24, 1964

3,126,397
PROCESS FOR PREPARING TROPYLIUM PERCHLORATE
Arne P. ter Borg, Robert van Helden, and Albert F. Bickel, all of Amsterdam, Netherlands, assignors to Shell Oil Company, New York, N.Y., a corporation of Delaware
No Drawing. Filed June 8, 1960, Ser. No. 34,607
Claims priority, application Netherlands July 20, 1959
2 Claims. (Cl. 260—350)

This invention relates to a novel process for the preparation of tropylium salts and their substitution products. The salts provided by the process of this invention may alternatively be described as cycloheptatrienylium salts and the substitution products thereof.

The tropylium salts obtained by this process are important intermediates in the preparation of tropyl ethers which may in turn be converted into tropones. For example, a salt of cycloheptatriene prepared according to this invention can be hydrolyzed to dicycloheptatrienyl ether which may in turn be converted to tropone (2,4,6-cycloheptatriene-1-one) by the process described in copending application Serial No. 34,610, filed June 8, 1960, now U.S. Patent No. 3,084,194.

In its generic aspect, the present invention provides a process for preparing a tropylium salt which comprises intermixing (a) an acid medium, (b) a cycloheptatriene having at least one hydrogen atom on its methylene carbon atom, and (c) an oxidizing agent having at least two oxygen atoms. This novel process is particularly advantageous since it produces the desired product in only one step, is easily carried out, requires a relatively short reaction time, and gives very high yields. All of the known processes that have been employed previously have been seriously deficient in one or more of these important respects.

The starting triene compound to be used may be either cycloheptatriene itself or it may be a substituted cycloheptatriene. Thus the starting material can be described as a compound of the formula

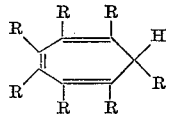

wherein each R is individually selected from the group consisting of the hydrogen atom, the halogen atoms, the alkyl radical, the aryl radical, the alkaryl radical, and the aralkyl radical. It is preferred that each substituent contain no more than 10 carbon atoms. Other functional substituents that are inert under the conditions of this process may also be present on the cycloheptatriene ring such as OH, $NO_2$, and COOH. It will be obvious to those skilled in the art that the starting compound to be used will be dictated by the product that is desired. If a tropylium salt having a particular substituent on the ring is desired, the corresponding cycloheptatriene having the particular substituent desired should be taken as the starting material. A representative group of suitable starting compounds would include among others 1,3,5-cycloheptatriene;
1-methyl-1,3,5-cycloheptatriene;
1,7-diethyl-1,3,5-cycloheptatriene;
3-phenyl-1,3,5-cycloheptatriene;
2,4-dichloro-1,3,5-cycloheptatriene;
3-bromo-4-ethylphenyl-1,3,5-cycloheptatriene;
1,3,5-trifluoro-1,3,5-cycloheptatriene;
5-phenylmethyl-6-iodo-1,3,5-cycloheptatriene; and
2,4,6-trimethyl-1,3,5-cycloheptatriene.

From the foregoing it will be seen that a great variety of compounds may be used in this process. However, it should be stressed that not more than one hydrogen atom in the methylene group of the cycloheptatriene used should be substituted.

The oxidation takes place very readily with cycloheptatriene and it is therefore preferred to use it as a starting material. One convenient source for this starting material is found in the product which is formed in the thermal isomerization of bicyclo[2.2.1]-2,5-heptadiene as disclosed in U.S. Patent No. 2,754,337.

The chemical reaction involved in the process of this invention may properly be described as an autooxidation reaction because it does not require a special oxidizing agent, other than atmospheric oxygen. Taking cycloheptatriene as a typically suitable starting material, the reaction may be represented by the following equation:

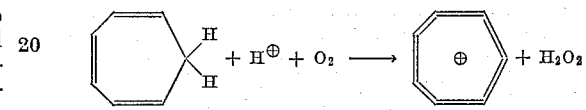

The tropylium ion produced by the reaction is recovered from the reaction mixture as a salt of the acid employed in the acid medium.

While the above equation illustrates the reaction with molecular oxygen, there are a number of other suitable oxidizing agents. In general, the process may be carried out with a conventional oxidizing agent having at least two oxygen atoms. However, to obtain the highest yields of product it is preferred to use an organic peracid, hydrogen peroxide, a quinone, or molecular oxygen. Suitable examples of preferred oxidizing agents are the percarboxylic acids such as peracetic acid, perbenzoic acid, perpropionic acid, perbutyric acid, mono- and diperphthalic acids, peracrylic acid, pertrichloracetic acid, pertrifluoroacetic acid, the benzoquinones, the naphthaquinones, the anthraquinones, air and other oxygen-containing gases, and the like. Because of its obvious low cost and availability and because it readily produces a high yield of desired product, molecular oxygen is most preferred.

It is essential for the reaction according to the invention to be carried out in an acid medium since it has been found that no oxidation occurs in a neutral medium. In general, the greater the acid strength, the higher are the yields. Therefore, while any organic or inorganic acid may be used, the strong organic and inorganic acids that are not oxidized under the conditions of this process are preferred. The yield obtained is, however, not a linear function of the acid strength, partly owing to the occurrence of such side reactions as epoxidation. The reaction is usually carried out in a medium consisting of one or more liquid acids. If desired, solvents, diluents, dispersing agents, etc., may also be present, provided these are non-basic. A suitable diluent is, for example, toluene.

The process is preferably carried out in the absence of water, at any rate in the presence of only a small amount of water, preferably not exceeding about 5% of the reaction mixture, since as a result of water taking up protons the acid strength of the medium and consequently the rate of the reaction is reduced.

The acid medium in which the oxidation is carried out preferably contains acetic acid or a halogenated acetic acid, or mixtures of these acids. In glacial acetic acid there is only a slow oxidation but the reaction rates and the yields are generally increased by the use of halogenated acetic acids. Very good results are obtained with trichloroacetic acid or with dichloroacetic acid.

The process according to the invention may be carried out very advantageously when a proper choice of reaction medium ensures thta the tropyluim salt to be produced precipitates therefrom during its formation. The oxidation is therefore preferably effected in the presence of an acid, the tropylium salt of which is insoluble in the reaction mixture. Perchloric acid, for example, is very suitable, since the relevant tropylium perchlorate is generally insoluble or only slightly soluble in many very suitable reaction mixtures.

Examples of very suitable reaction mixtures are: anhydrous mixtures of perchloric acid and acetic acid, or of perchloric acid and, for example, equal volumes of acetic acid and trichloroacetic acid. The ratio between the acids in a mixed acid medium is not critical however and may be varied over a considerable range, although larger amounts of halogenated acetic acid amounting to half or more of the medium are preferred.

The acids of the acid medium are used in large excess over the reactants and the precise quantity chosen will be such that provides a convenient volume for carrying out the reaction.

A higher yield generally results from the use of an excess of the cycloheptatriene with respect to the acid from which the tropylium salt to be produced is derived (e.g., perchloric acid). Still higher yields are obtained with the use of an excess of 10 or more equivalents but the yield also depends on a number of other variables, such as temperature, reaction period, the presence of any water, partial oxygen pressure (if oxygen is the oxidant), etc. In many cases use is preferably made of an excess of not more than 10 equivalents, in particular between 2 and 6 equivalents, per equivalent of the acid used.

The operating temperatures are generally in the range from 0° to 100° C. although higher or lower temperatures may also be used. In many cases good results are obtained between 30° C. and 50° C. The optimum temperature to be used depends on several factors such as pressure and the particular oxidizing agent selected, for example, if oxygen gas is used, more oxygen dissolves at higher pressures and the temperature may therefore be kept lower.

It has been found that the temperature ranges indicated above are very suitably utilized in connection with oxygen or an oxygen-containing gas such as air. The process may be carried out at partial oxygen pressures in the range of from 0.2 to 2.0 atm. abs., yields increasing with rising pressure. Hence, partial oxygen pressures of more than 2.0 atm. abs. may frequently be advantageous although pressure of lower than 0.2 atm. abs. may also be used.

Details of the process of this invention are best illustrated by the following examples. It is to be understood that they are offered for illustration only and are not to be construed as limiting the invention in any way.

*Example I*

100 ml. of glacial acetic acid were introduced into a reaction vessel to which were added 5 ml. of a 72% by weight aqueous solution of perchloric acid (60 moles of $HClO_4$). 13.2 g. of glacial acetic were then added and oxygen was passed through the resultant solution at a rate of 4 liters/hour, a temperature of 40° C., and a pressure of 1 atm. abs. in order to convert the water present in the mixture into acetic acid. After 15 minutes a 24.4 g. quantity of technical cycloheptatriene was added, after which the mixture was kept at 40° C. for 40 minutes. The resultant tropylium perchlorate was finally filtered off, washed with glacial acetic acid and air-dried at room temperature. (Tropylium perchlorate explodes on heating.) The yield was 7.0 g. (60.4%, based on $HClO_4$). Equivalent weight, determined by titration with 0.1 N caustic alkali solution: 190.7; calculated: 190.5. Ultraviolet spectrum (in concentrated $H_2SO_4$): $\lambda_{max}$ 216.0 ($\epsilon$ 42,400), $\lambda_{max}$ 273.0 ($\epsilon$ 4550), $\lambda_{max}$ 279.0 ($\epsilon$ 4160).

*Example II*

(a) A mixture of 101.9 g. of trichloroacetic acid, 49.7 g. of glacial acetic acid and 13.2 g. of acetic acid anhydride was heated to 40° C. in the manner described in Example I while oxygen was passed through A 5 ml. quantity of a 72 by weight aqueous solution of perchloric acid was then added. After 15 minutes the water present was converted into acetic acid, the resultant solution containing 50% by volume of trichloroacetic acid. A 24.4 g. quantity of technical cycloheptatriene was then added, after which the mixture was kept at 40° C. for 40 minutes. The mixture was worked up as described in Example I. The yield was 9.61 g. of tropylium perchlorate.

(b) The experiment described under (a) was repeated, starting from a solution consisting of 34.6 g. of trichloroacetic acid, 93.0 g. of glacial acetic acid and 13.2 g. of acetic acid anhydride. The solution obtained by hydrolysis of the acetic acid anhydride contained 17% by volume of trichloroacetic acid. The yield was 8.30 g. of tropylium perchlorate.

(c) The experiments described under (a) and (b) were carried out in the absence of trichloroacetic acid. The starting mixture was 115.3 g. of glacial acetic acid and 13.2 g. of acetic acid anhydride. The yield obtained was 6.97 g. of tropylium perchlorate.

The yields obtained in this example according to (a), (b) and (c) show the favorable effect of the presence of trichloroacetic acid.

*Example III*

A mixture of 75 ml. of dichloroacetic acid and 24 g. of technical cycloheptatriene was contacted with an oxygen atmosphere by vigorous stirring at 40° C. in a stirred reaction vessel (vibromixer) which was placed in a thermostat. During this treatment 680 ml. of oxygen was taken up in 13 minutes. The reaction mixture was then poured out in a nitrogen atmosphere into a mixture of acetic acid and perchloric acid prepared as described in Example I (in this case, however, nitrogen was passed through). The precipitated tropylium perchlorate was also worked up as described in Example I. The yield was 7.4 g.

*Example IV*

13.2 g. of acetic acid anhydride and 5 ml. of a 72% by weight of aqueous solution of perchloric acid were added in a reaction vessel to 50 ml. of glacial acetic acid in a nitrogen atmosphere. The mixture was kept at 40° C. for 30 minutes, after which 6.5 g. of benzoquinone and 24.4 g. of cycloheptatriene were successively added. A precipitate of tropylium perchlorate was formed. The precipitate was worked up as described in Example I. The yield was 9.3 g.

*Example V*

A 2 ml. quantity of a 72% by weight aqueous solution of perchloric acid was added to 75 ml. of glacial acetic acid, followed by 1 ml. of a 30% aqueous $H_2O_2$ solution. A 9.6 g. quantity of acetic acid anhydride was added to this mixture with cooling, the temperature being kept below 40° C. In a thermostat 9.6 g. of technical cycloheptatriene were added to the mixture at 40° C. in a nitrogen atmosphere of a pressure of 1.1 atm. abs. After 20 minutes the resultant tropylium perchlorate was filtered off and worked up as described in Example I. The yield was 5.2 g.

The diacetate of cyclohepta-1,3-diene-5,6-diol obtained as by-product can be isolated from the filtrate.

We claim as our invention:

1. A process for the production of tropylium perchlorate which comprises oxidizing cycloheptatriene in substantially anhydrous acidic medium, said acidic medium selected from the group consisting of acetic acid, halogenated acetic acid and a mixture of acetic acid and halogenated acetic acid, with molecular oxygen at a temperature from about 0° C. to about 100° C. in the presence of from 0.1 to 0.5 mole of perchloric acid per mole of cycloheptatriene.

2. A process for the production of tropylium perchlorate which comprises oxidizing cycloheptatriene in substantially anhydrous acidic medium, said acidic medium selected from the group consisting of acetic acid, halogenated acetic acid and a mixture of acetic acid and halogenated acetic acid, with hydrogen peroxide at a temperature from about 0° C. to about 100° C. in the presence of from 0.1 mole to 0.5 mole of perchloric acid per mole of cycloheptatriene.

References Cited in the file of this patent

Pearson, D. L.: A thesis submitted in partial fulfillment of the requirements for the degree of Doctor of Philosophy, Part III: Synthesis and properties of cycloheptatrienylium salts, University of Washington, 1955. (Doctoral Dissertation Series Publication No. 12,135, University Microfilm, Ann Arbor, Mich.) (Pages 181, 235 and 236 relied upon.)

Doering et al.: "Jour. Am. Chem. Soc.," vol. 79, p. 352 (1957).